United States Patent
Nakamura et al.

(10) Patent No.: US 9,616,936 B2
(45) Date of Patent: Apr. 11, 2017

(54) UPPER VEHICLE-BODY STRUCTURE OF VEHICLE

(71) Applicant: MAZDA MOTOR CORPORATION, Hiroshima (JP)

(72) Inventors: Takeshi Nakamura, Hiroshima (JP); Keizo Kawasaki, Hiroshima (JP); Kenichi Sato, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/018,251

(22) Filed: Feb. 8, 2016

(65) Prior Publication Data

US 2016/0236721 A1 Aug. 18, 2016

(30) Foreign Application Priority Data

Feb. 18, 2015 (JP) .................................. 2015-029799

(51) Int. Cl.
*B62D 25/06* (2006.01)

(52) U.S. Cl.
CPC .................................. *B62D 25/06* (2013.01)

(58) Field of Classification Search
CPC ............................... B62D 25/06; B62D 25/04
USPC .................................................. 296/201, 210
See application file for complete search history.

(56) References Cited

U.S. PATENT DOCUMENTS

| 2007/0035161 A1* | 2/2007 | Huisingh | .................. | B60R 7/04 |
| | | | | 296/215 |
| 2013/0181487 A1* | 7/2013 | Krueger | ............... | B62D 29/005 |
| | | | | 296/210 |

FOREIGN PATENT DOCUMENTS

| JP | 2002-248943 A | 9/2002 |
| JP | 2014-058224 A | 4/2014 |

* cited by examiner

*Primary Examiner* — Joseph D Pape
(74) *Attorney, Agent, or Firm* — Studebaker & Brackett PC

(57) ABSTRACT

There are provided a pair of roof rails, a roof panel, a front header, a pair of front pillars, a windshield provided between the front header and the front pillars, a front inclination roof reinforcement extending rearward, a front portion of which is joined to the front header, and partition members provided inside the front header at respective positions which do not overlap with, in a vehicle width direction, the front inclination roof reinforcement. Thereby, vertical vibrations of the front header caused by vertical vibrations of the windshield can be suppressed with a light structure, so that the comfortability of the ride (the vibration damping performance) can be improved.

6 Claims, 8 Drawing Sheets

UPPER VEHICLE-BODY STRUCTURE OF VEHICLE

BACKGROUND OF THE INVENTION

The present invention relates to an upper vehicle-body structure of a vehicle comprising a pair of right-and-left roof rails extending in a vehicle longitudinal direction at right-and-left both end portions of a roof portion of a vehicle body, a roof panel provided between the pair of right-and-left roof rails, a front header provided at a front portion of the roof panel and extending in a vehicle width direction, a pair of right-and-left front pillars joined to the roof rails at upper portions thereof and extending downward, and a windshield (front window) provided between the front header and the front pillars.

An upper vehicle-body structure of a vehicle comprising a roof panel which forms a roof portion of a vehicle body and a roof reinforcement which is provided below the roof panel to extend in the vehicle width direction is known as exemplified by the upper vehicle-body structures disclosed in Japanese Patent Laid-Open Publication Nos. 2014-58224 and 2002-248943.

The above-described first patent document discloses the upper vehicle-body structure of the vehicle, in which the roof reinforcement is formed in a W shape in the side view such that it has joint faces to be joined to a lower face of the roof panel at its longitudinal-both end portions and its longitudinal-central portion, and the other portion of the roof reinforcement than the above-described joint faces is spaced downward apart from the lower face of the roof panel, wherein this roof reinforcement is joined to the lower face of the roof panel. The structure of the above-described first patent document improves a tensional rigidity of the roof panel (see paragraphs [0038], [0049] of the above-described first patent document).

The above-described second patent document discloses a sunroof structure for a vehicle as an upper vehicle-body structure of the vehicle, in which first and second cross members as a roof reinforcement are arranged in an X shape in the plan view. The X-shaped first and second cross members increase a rigidity of the roof (see paragraph [0027] of the above-described second patent document).

The inventors of the present invention have conducted the researches for improving the comfortability of the ride, and have found that it is necessary to improve the vibration damping performance for the improvement of the comfortability of the ride. Herein, the vibration damping performance means the performance aiming at reducing vibrations of the frequency band (mode) of 20-50 Hz (vibrations in which a passenger feels shaking with passenger's feet or the like). The inventors have found that vertical vibrations of the front header which are caused by vertical vibrations of the windshield are one factor of that.

While it may be expected that the structures disclosed in the above-described patent documents could provide some effects in suppressing the vertical vibrations of the front header caused by the vertical vibrations of the windshield, more researches have been required to improve the comfortability of the ride.

SUMMARY OF THE INVENTION

Accordingly, an object of the present invention is to provide an upper vehicle-body structure of a vehicle which can properly suppress the vertical vibrations of the front header caused by the vertical vibrations of the windshield with a light structure, thereby improving the comfortability of the ride (the vibration damping performance).

The present invention is an upper vehicle-body structure of a vehicle, comprising a pair of right-and-left roof rails extending in a vehicle longitudinal direction at right-and-left both end portions of a roof portion of a vehicle body, a roof panel provided between the pair of right-and-left roof rails, a front header provided at a front portion of the roof panel and extending in a vehicle width direction, a pair of right-and-left front pillars joined to the roof rails at upper portions thereof and extending downward, a windshield (front window) provided between the front header and the front pillars, a longitudinal reinforcement extending rearward, a front portion of which is joined to the front header, and a partition member provided inside the front header at a position which does not overlap with, in the vehicle width direction, the longitudinal reinforcement.

According to the present invention, since the partition member is provided inside the front header at the position which does not overlap with, in the vehicle width direction, the longitudinal reinforcement, the vertical vibrations of the front header caused by the vertical vibrations of the windshield can be suppressed in cooperation with the longitudinal roof reinforcement and the partition member. Thus, the vertical vibrations of the front header are so suppressed that the comfortability of the ride (the vibration damping performance) can be improved.

Further, in a case in which the above-described longitudinal roof reinforcement is constituted by a pair of members positioned on both sides, the direction of extension of the pair of longitudinal roof reinforcements can be an inclined direction or a parallel direction. In a case of the above-described inclined direction, for example, the pair of longitudinal roof reinforcements can be configured in a roughly inverse-V shape in a plan view such that a lateral (i.e., vehicle width directional) distance therebetween becomes gradually wider toward a vehicle rear side, or in a roughly V shape in the plan view such that the lateral distance therebetween becomes gradually narrower toward the vehicle rear side.

In an embodiment of the present invention, the longitudinal reinforcement comprises a pair of right-and-left longitudinal reinforcements arranged side by side in the vehicle width direction, a front portion of one of the pair of longitudinal reinforcements is joined to a point between a central portion of the front header and one of both outward end portions, in the vehicle width direction, of the front header, a front portion of the other of the pair of longitudinal reinforcements is joined to a point between the central portion of the front header and the other of the both outward end portions, in the vehicle width direction, of the front header, each of the pair of longitudinal reinforcements is configured to extend obliquely rearward and outward such that a rear portion thereof is positioned in the vicinity of a center pillar of the vehicle, and the partition member comprises a central partition member positioned at the central portion of the front header and a pair of right-and-left outward partition members positioned at an outward side, in the vehicle width direction, of respective joint portions of the pair of right-and-left longitudinal reinforcements to the front header.

According to this embodiment, the above-described effects that the vertical vibrations of the front header caused by the vertical vibrations of the windshield can be suppressed in cooperation with the longitudinal roof reinforcement and the partition member can be further enhanced.

Herein, the followings may be preferable configurations as some embodiments of the present invention from certain aspects.

The above-described partition member comprises a slant upper face which slants rearward and upward, a pair of right-and-left side wall portions which extend downward from both sides, in the vehicle width direction, thereof, and side flange portions which respectively extend outward, in the vehicle width direction, from respective lower ends and respective rear ends of the side wall portions.

Further, the partition member further comprises a rear flange portion which protrudes rearward and upward from a rear end of the slant upper face and a front flange portion which protrudes forward and downward from a front end of the slant upper face, and the rear flange portion and the front flange portion are joined between the roof panel and the front header.

Additionally, each of the above-described central partition member and the above-described outward partition member comprises a slant upper face which slants rearward and upward, a pair of right-and-left side wall portions which extend downward from both sides, in the vehicle width direction, thereof, and side flange portions which respectively extend outward, in the vehicle width direction, from respective lower ends and respective rear ends of the side wall portions, and a width, in the vehicle width direction, of the slant upper face of the central partition member is configured to be substantially constant along the vehicle longitudinal direction, whereas the width, in the vehicle width direction, of the slant upper face of the outward partition member is configured to become wider gradually toward a vehicle rear side.

Other features, aspects, and advantages of the present invention will become apparent from the following description which refers to the accompanying drawings.

DETAILED DESCRIPTION OF THE INVENTION

Figure 1:
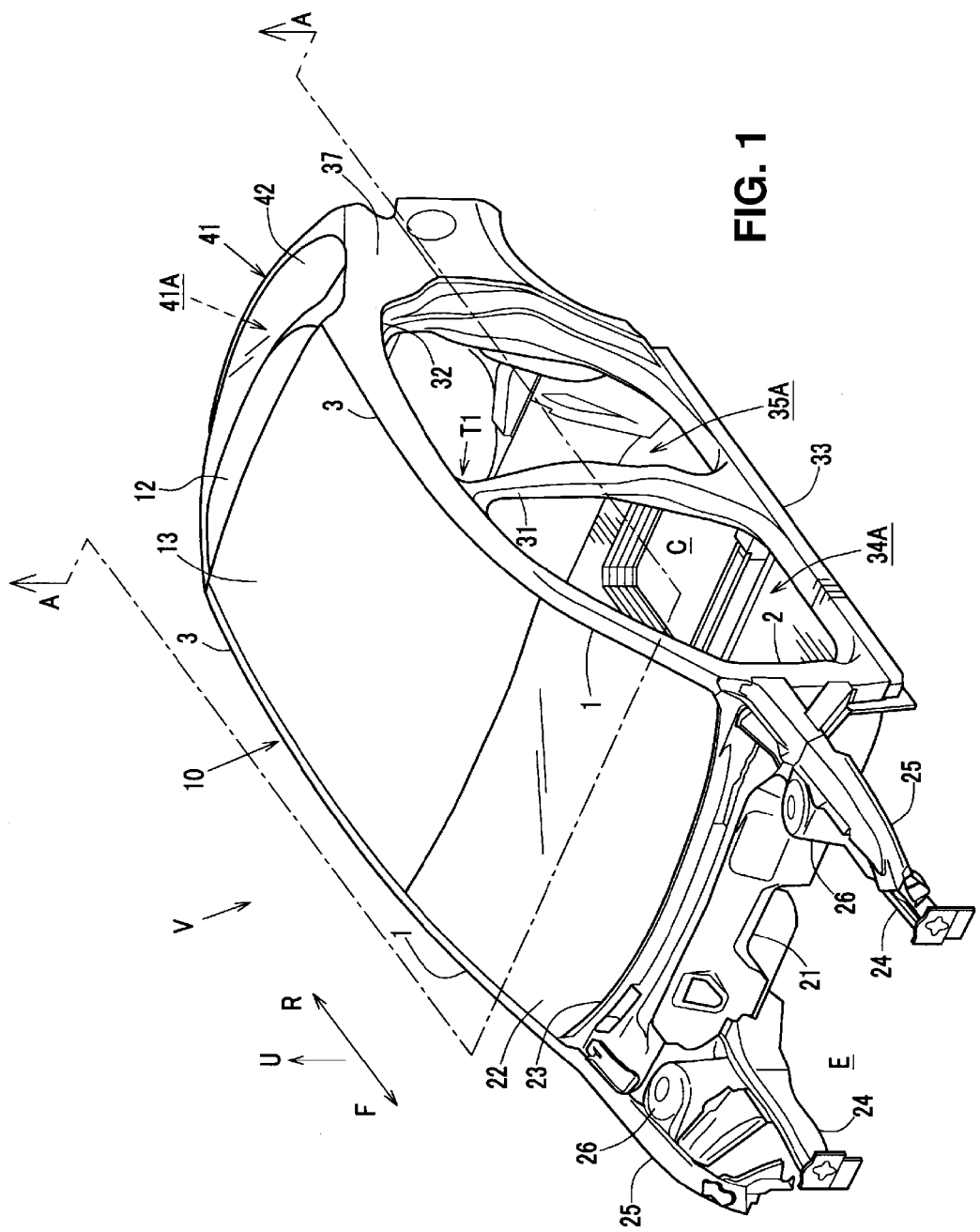
FIG. 1 is a perspective view showing a vehicle according to a first embodiment, omitting illustration of part of the vehicle.

Hereafter, embodiments of the present invention will be described referring to the drawings. FIG. 1 is a perspective view showing a vehicle according to a first embodiment, omitting illustration of part of the vehicle, and FIG. 2 is a perspective view showing a frame structure of the vehicle according to the first embodiment.

Figure 2:
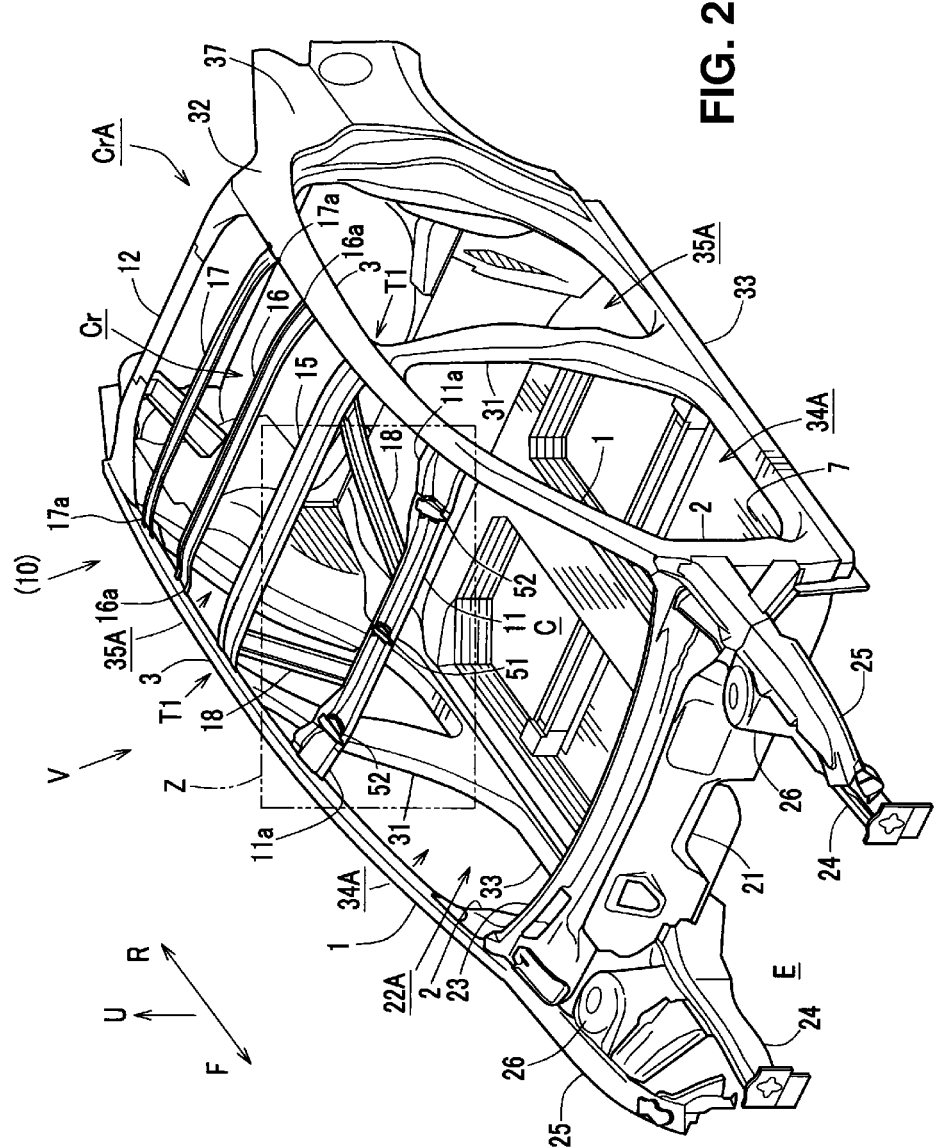
FIG. 2 is a perspective view showing a frame structure of the vehicle according to the first embodiment.
Figure 3:
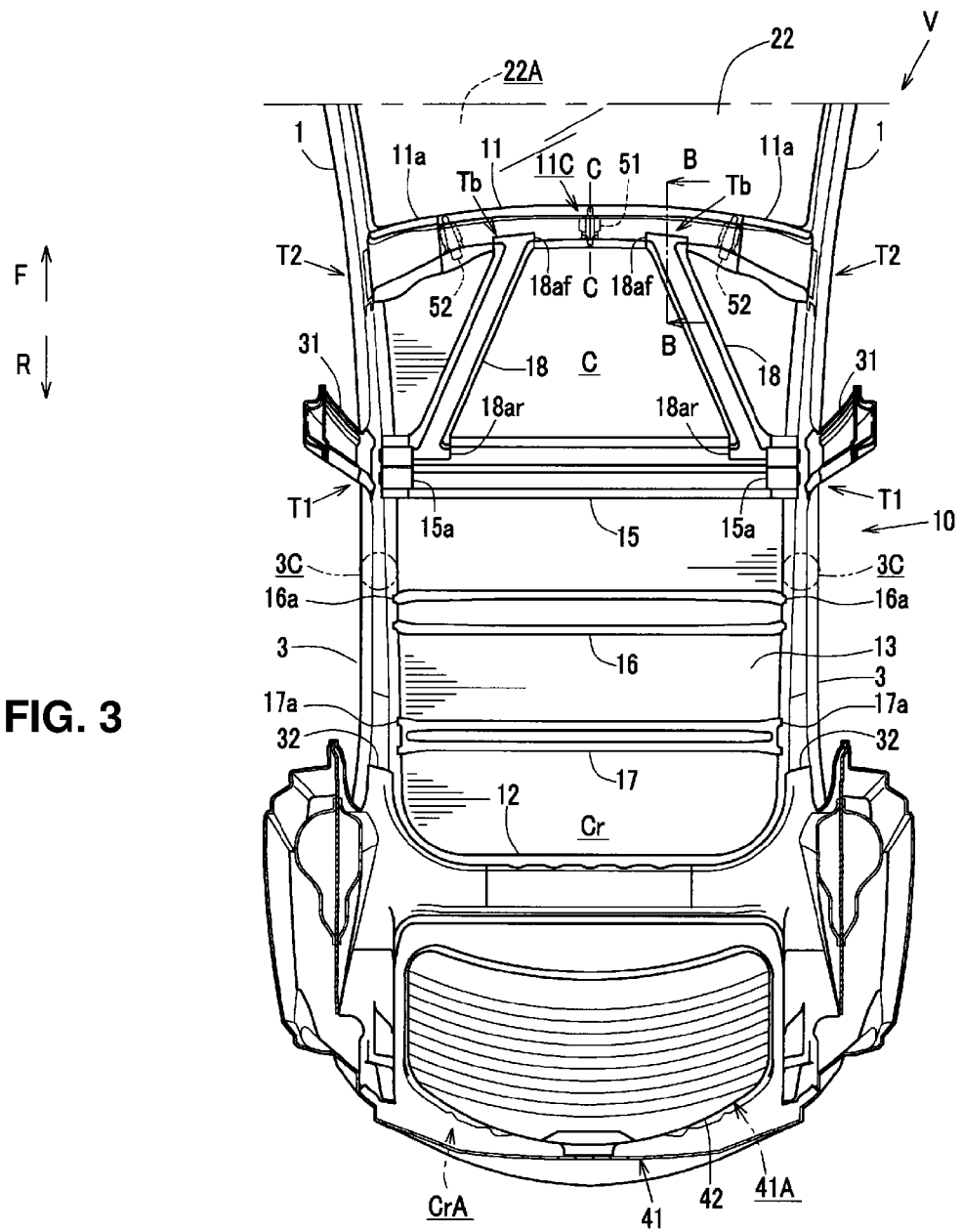
FIG. 3 is a bottom view of an upper vehicle-body structure of the vehicle according to the first embodiment.
Figure 4:
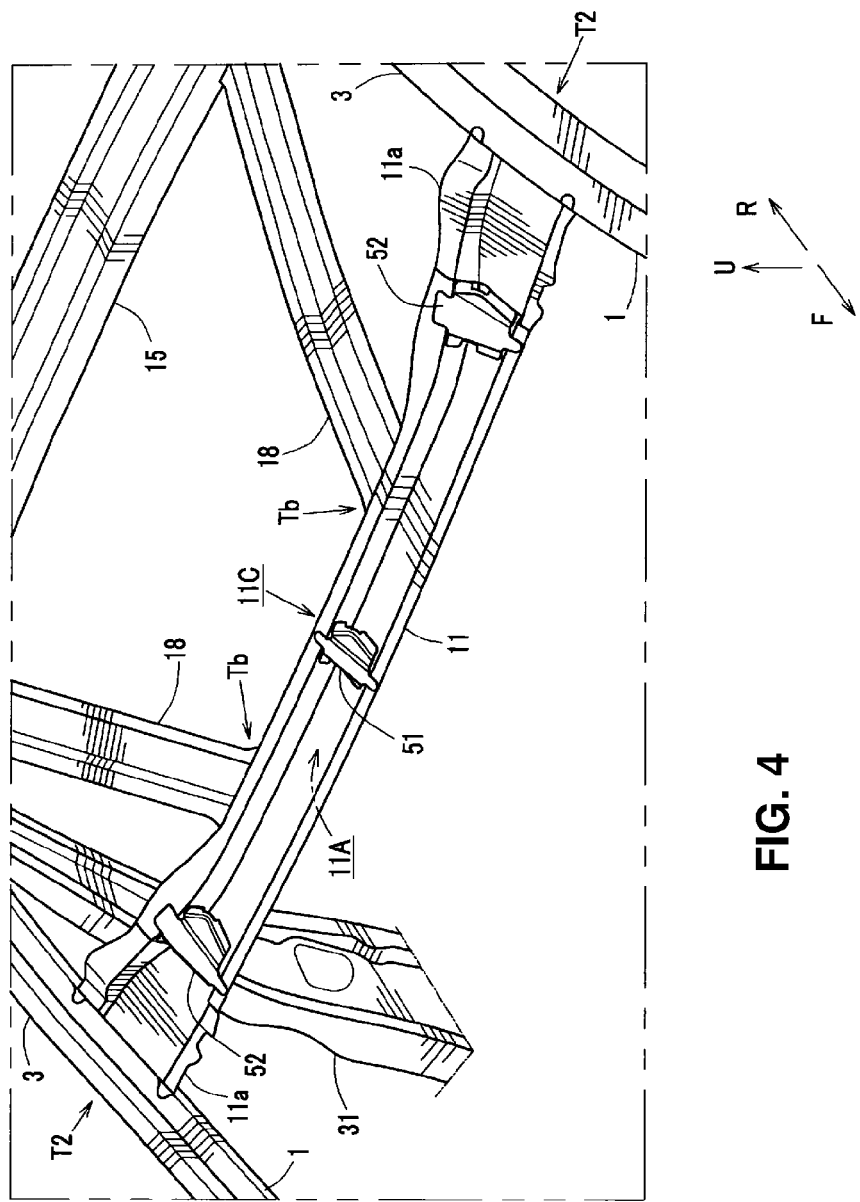
FIG. 4 is a perspective view of a front-side portion of the upper vehicle-body structure of the vehicle according to the first embodiment.
Figure 5A:
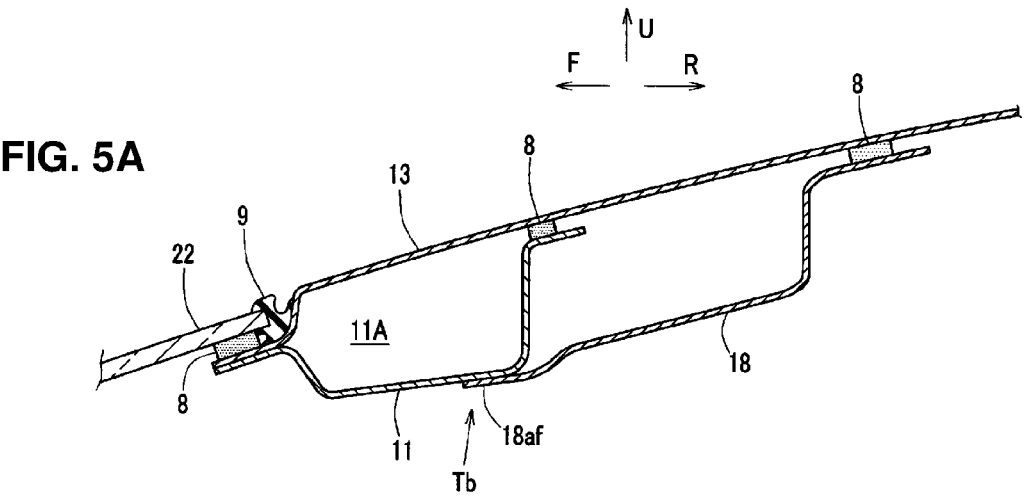
FIGS. 5A and 5B are sectional views showing an inner structure of a front header according to the first embodiment.
Figure 5B:
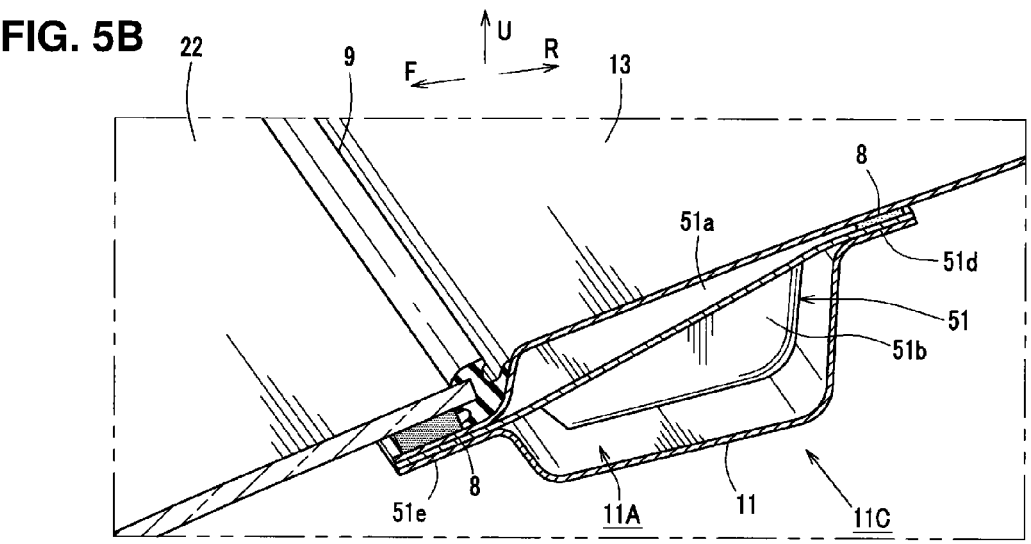
Figure 6:
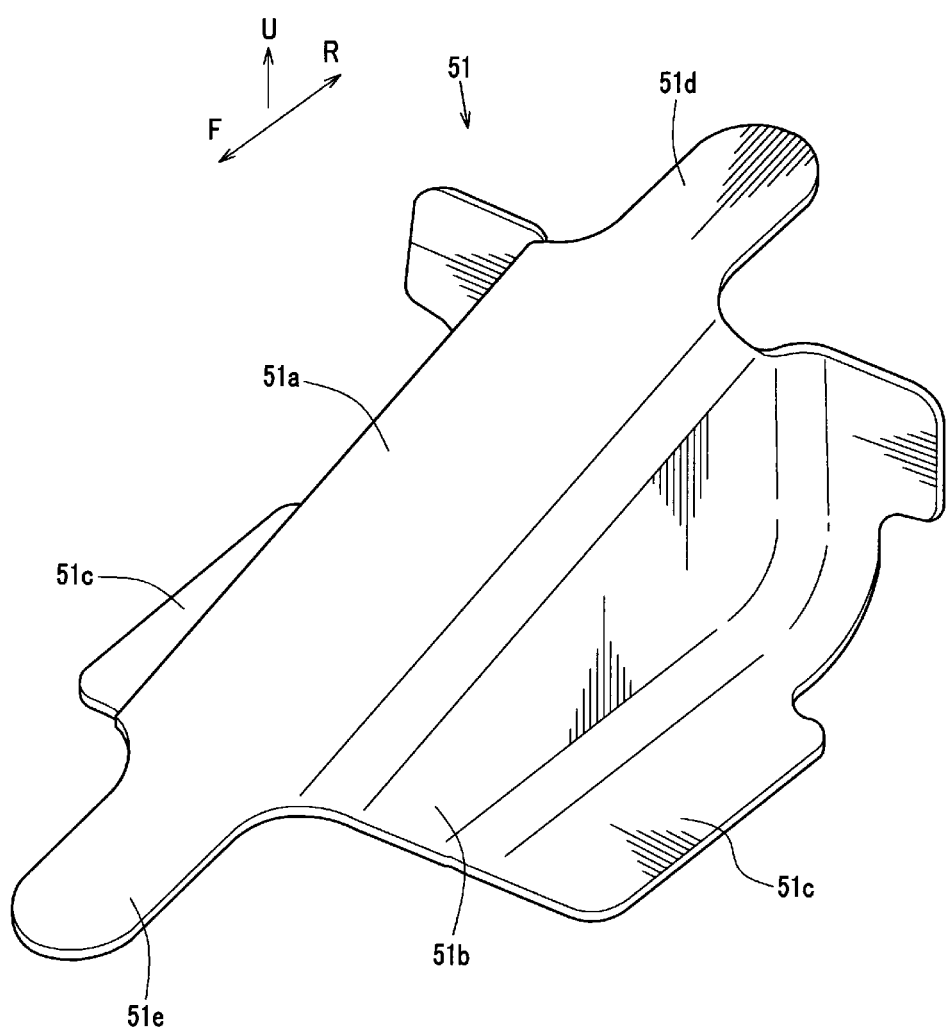
FIG. 6 is a perspective view of a central partition member according to the first embodiment, when viewed obliquely from front, left and upper sides of the vehicle.
Figure 7:
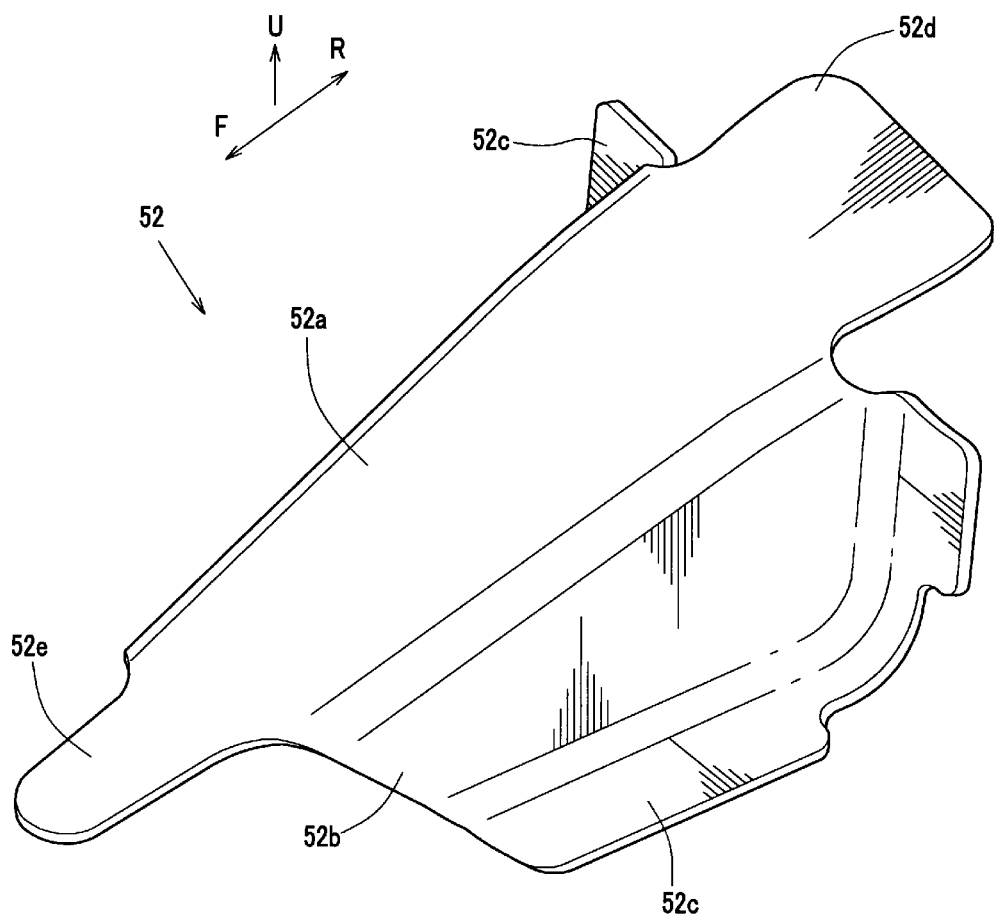
FIG. 7 is a perspective view of an outward partition member according to the first embodiment, when viewed obliquely from the front, left and upper sides of the vehicle.
Figure 8:
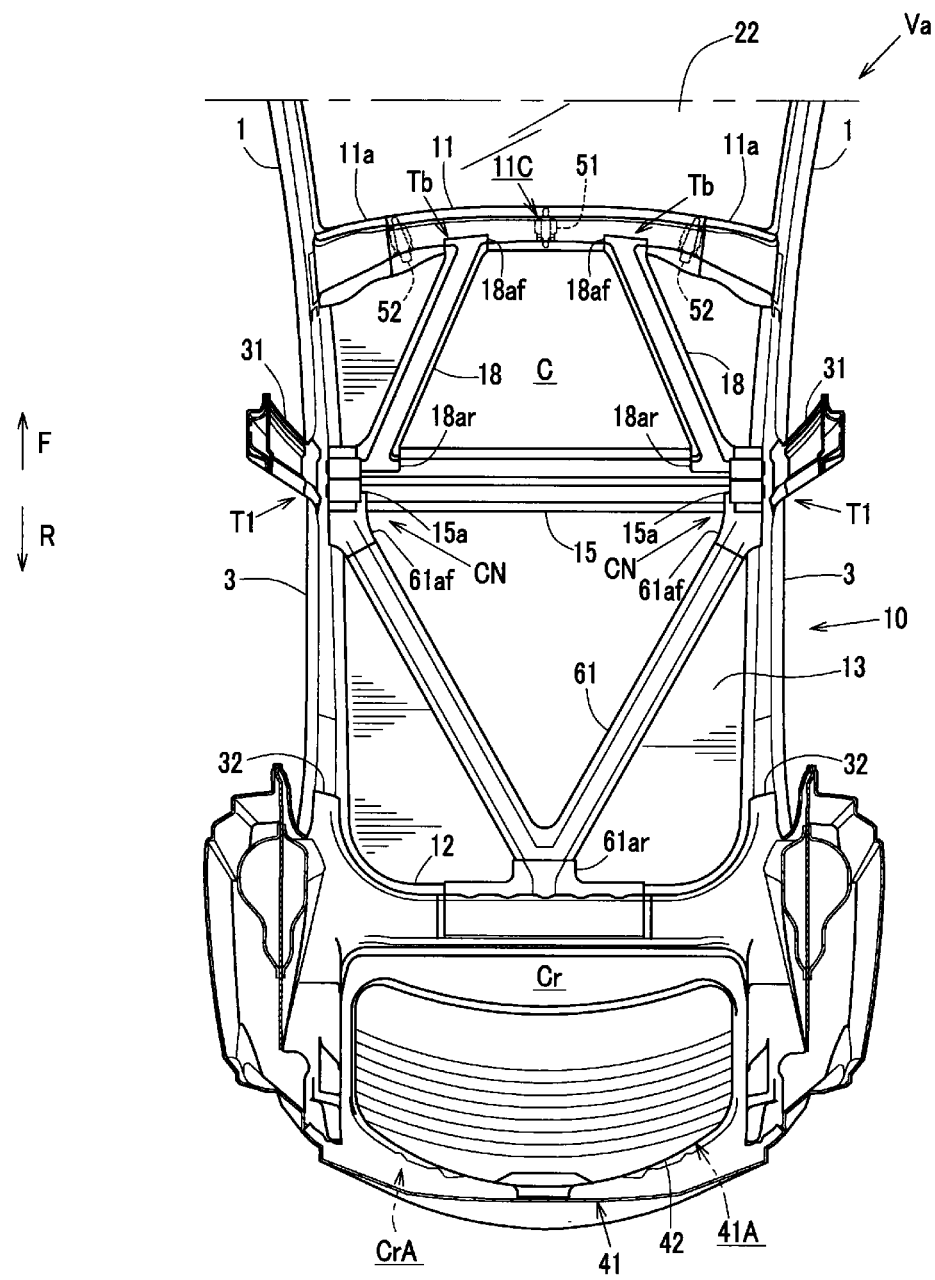
FIG. 8 is a bottom view of an upper vehicle-body structure of the vehicle according to a second embodiment.

FIG. 3 is a view of an upper vehicle-body structure of the vehicle according to the first embodiment, when viewed from a bottom face, which is a sectional view taken along line A-A of FIG. 1. FIG. 4 is an enlarged view of a front-side portion of the upper vehicle-body structure of the vehicle in an area Z of FIG. 2. FIG. 5A is a sectional view taken along line B-B of FIG. 3, and FIG. 5B is a sectional view taken along line C-C of FIG. 3, when viewed obliquely from front, left and upper sides of the vehicle. FIG. 6 is a perspective view of a central partition member according to the first embodiment, when viewed obliquely from the front, left and upper sides of the vehicle, and FIG. 7 is a perspective view of an outward partition member according to the first embodiment, when viewed obliquely from the front, left and upper sides of the vehicle. FIG. 8 is a view of an upper vehicle-body structure of the vehicle according to a second embodiment, when viewed from a bottom face, which is a sectional view corresponding to the sectional view taken along line A-A of FIG. 1. In the figures, an arrow F shows a front side of a vehicle body, an arrow R shows a rear side of the vehicle body, and an arrow U shows an upper side of the vehicle body.

Embodiment 1

As shown in FIGS. 1 and 2, a pair of front pillars 1, 1 which extend obliquely upward and rearward from a lower portion of a front side at both sides, in a vehicle width direction, of a vehicle are provided at an upper portion of a vehicle V according to a first embodiment. And, respective lower portions of the front pillars 1, 1 connect to a pair of hinge pillars 2, 2 which extend in a vertical direction.

The front pillar 1 is a vehicle-body rigidity member having a closed cross section, which is formed by joining a front pillar inner and a front pillar outer, and also the hinge pillar 2 is another vehicle-body rigidity member having a closed cross section, which is formed by joining a hinge pillar inner and a hinge pillar outer.

As shown in FIGS. 1-3, a pair of right-and-left roof rails 3, 3 (roof side rails) which extend in a vehicle longitudinal direction, respectively, are provided to connect to rear ends of the above-described right-and-left front pillars 1, 1, a front header 11 which extends in the vehicle width direction (see FIGS. 2 and 3) is provided between respective upper end portions of the right-and-left front pillars 1, 1, and a rear header 12 which extends in the vehicle width direction is provided between respective rear end portions of the right-and-left roof rails 3, 3.

As shown in FIGS. 2, 3 and 4, joint flanges 11a are joined to both end portions, in the vehicle width direction, of the front header 11, and the front header 11 is joined (fixedly joined) to the roof rails via the joint flanges 11a. Herein, the joint flange 11a is configured such that its inward end has substantially the same width (a length of the vehicle longitudinal direction) as the front header 11 and also its outward portion has a wider width (see FIGS. 3 and 4).

An area which is enclosed by the pair of right-and-left roof rails 3, 3, the front header 11, and the rear header 12 is covered with a steel-made roof panel 13 which is provided at the upper portion of the vehicle to expand both in the vehicle longitudinal direction and in the vehicle width direction (see FIGS. 1 and 3).

The roof panel 13 is arranged to cover over at least part of the front header 11 and the rear header 12 in addition to the above-described area. Accordingly, the front header 11 and the rear header 12 form a roughly closed-cross section structure together with the roof panel 13 arranged above these headers 11, 12, which are vehicle-body rigidity members extending in the vehicle width direction that are provided at a front portion or a rear portion of the roof panel 13.

The closed-cross section structure of the front header 11 will be described specifically. The front header 11 is, as shown in FIGS. 5A and 5B, configured to have a cross section which has a roughly hat shape opening upward. Therefore, a closed-cross section space 11A is formed between the front header 11 and the roof panel 13 which covers over an upper opening of the front header 11. In FIGS. 5A and 5B, reference character 9 denotes a seal member.

Further, as shown in FIGS. 1-3, a center pillar 31 which extends in the vertical direction is provided to connect to a portion of the roof rail 3 extending in the vehicle longitudinal direction which is positioned in front of a central portion, in the vehicle longitudinal direction, of the roof rail 3 (a circle point 3C shown by a two-dotted broken line in FIG. 3), and a rear pillar 32 which extends in the vertical direction is provided to connect to a rear end portion of the roof rail 3.

Meanwhile, as shown in FIGS. 1 and 2, a side sill 33 which extends rearward from a lower portion of the hinge pillar 2 is provided at a lower portion of the vehicle, and a lower portion of the center pillar 31 extending in the vertical direction is joined to a central portion, in the vehicle longitudinal direction, of the side sill 33.

Further, at a front portion of the vehicle is provided a dash panel 21 which is configured to rise from a front end of a floor panel 7 and extend in the vehicle width direction over a roughly entire width of the vehicle so as to partition a cabin C from an engine room E. Above this dash panel 21 is provided a cowl panel 23 which extends in the vehicle width direction so as to support a lower end of a windshield (front window) 22 (see the same figures). In FIGS. 1 and 2, reference character 24 denotes a pair of right-and-left front side frames which extend in the vehicle longitudinal direction at both sides of the engine room E positioned in front of the dash panel 21, reference character 25 denotes a pair of right-and-left apron reinforcements which extend forward from respective upper end portions of the hinge pillars 2 at positions which are spaced upward and outward apart from the pair of right-and-left front side frames 24, and reference character 26 denotes a pair of right-and-left suspension tower portions which are provided on the both sides, in the vehicle width direction, of the engine room E.

As shown in FIG. 2, the vehicle V has a windshield opening portion 22A which is enclosed by the front header 11, the right-and-left front pillars 1, 1, and the cowl panel 23, a front-side side door opening 34A which is enclosed by the hinge pillar 2, the front pillar 1, a front portion of the roof rail 3, the center pillar 31, and the side sill 33, and a rear-side side door opening 35A which is enclosed by the center pillar 31, a rear portion of the roof rail 3, the rear pillar 32, a rear body side portion 37 including a rear fender, and the side sill 33. The windshield 22 is arranged at the windshield opening portion 22A (see FIGS. 1 and 3), a front side door, not illustrated, is openably arranged at the front-side door opening 34A, and a rear side door, not illustrated, is openably arranged at a rear-side door opening 35A.

Meanwhile, a rear baggage-room opening CrA which opens rearward from a rear baggage room Cr positioned behind the cabin C is formed at a vehicle rear portion (see FIGS. 2 and 3), and as shown in FIGS. 1 and 3, this rear baggage-room opening CrA is covered with a lift gate 41 (back door) with a pivotal point provided at a rear end (a portion of the rear header 12) of the roof panel 13. Thus, a hatchback type of vehicle is configured. The lift gate 41 has a lift-gate opening portion 41A, where a rear window 42 is openably provided (see FIGS. 1 and 3).

Further, as shown in FIGS. 2 and 3, plural roof reinforcements 15-18 are provided between the front header 11 and the rear header 12 below the roof panel 13 (on the side of the cabin C), and a roof portion 10 is formed by the roof panel 13, the front header 11, the rear header 12, and the plural roof reinforcements 15-18 (see FIGS. 1 and 3).

An adhesive agent 8 is added onto upper faces of the front header 11, the rear header 12, and the roof reinforcements 15-18 (see FIGS. 5A and 5B, for example), which are respectively made to adhere to a lower face of the roof panel 13 by means of this adhesive agent 8.

Further, as shown in FIGS. 2 and 3, the above-described plural roof reinforcements 15-18 comprise the front-side vehicle-width-direction roof reinforcement 15, the rear-side first vehicle-width-direction roof reinforcement 16, the rear-side second vehicle-width-direction roof reinforcement 17, and the front inclination roof reinforcements 18.

The front-side vehicle-width-direction roof reinforcement 15 extends straightly in the vehicle width direction between the pair of right-and-left roof rails 3, 3, joint flanges 15a are respectively joined to both outward end portions, in the vehicle width direction, of this reinforcement 15 as shown in FIG. 3, and the front-side vehicle-width-direction roof reinforcement 15 is joined to the roof rails 3 via the joint flanges 15a at each position which at least partially overlaps with, in the vehicle longitudinal direction, an arrangement position of the center pillar 31.

Also, the rear-side first vehicle-width-direction roof reinforcement 16 and the prear-side second vehicle-width-direction roof reinforcement 17 have, as shown in FIGS. 2 and 3, joint pieces 16a, 17a which are integrally formed at their both end portions, respectively. These joint pieces 16a, 17a are joined to respective longitudinal points of the roof rails 3, 3 by spot welding or the like, so that these reinforcements 16, 17 are joined to the roof rails 3, 3.

Thus, the rear-side first vehicle-width-direction roof reinforcement 16 is provided to interconnect the roof rails 3, 3 at a position located slightly in back of the roughly central portion 3C (see FIG. 3), in the vehicle longitudinal direction, of the roof rails 3, 3, and the rear-side second vehicle-width-direction roof reinforcement 17 is provided at a roughly central position, in the vehicle longitudinal direction, between the rear-side first vehicle-width-direction roof reinforcement 16 and the rear header 12.

Further, the above-described front inclination roof reinforcements 18 are configured as a pair of members which are arranged side by side in the vehicle width direction as shown in FIGS. 2 and 3, and their front portions are joined to the front header 11. Each of these reinforcements 18, 18 extends obliquely rearward and outward. In the present embodiment, the pair of right-and-left front inclination roof reinforcements 18, 18 are configured in a roughly inverse-V shape in the plan view such that their front portions are spaced apart from each other and a lateral (i.e., vehicle width directional) distance therebetween becomes gradually wider toward the vehicle rear side (see FIG. 3). Each of the rear portions of the right-and-left front inclination roof reinforcements 18, 18 is joined to a portion located in the vicinity of a joint portion T1 of the center pillar 31 and the roof rail 3 (see FIGS. 2 and 3).

Specifically, joint flanges 18af, 18ar (the front-end joint flange 18af and the rear-end joint flange 18ar) are integrally formed at front-and-rear both end portions of the pair of right-and-left front inclination roof reinforcements 18, 18 as shown in FIG. 3. And, as shown in FIGS. 3 and 4, the front-end joint flange 18af of the left-side front inclination roof reinforcement 18 is joined to a portion of the front header 11 between the central portion 11C and the left-side outward end portion (the left-side joint flange 11a) (see FIG. 5A), and the front-end joint flange 18af of the right-side front inclination roof reinforcement 18 is joined to a portion of the front header 11 between the central portion 11C and the right-side outward end portion (the right-side joint flange 11a).

Further, on each side, in the vehicle width direction, of the vehicle, the rear-end joint flange 18ar of the front inclination roof reinforcement 18 is joined substantially to the same position as the joint flange 15a at the outward end portion, in the vehicle width direction, of the front-side vehicle-width-direction roof reinforcement 15, or to a position located slightly inward from the joint flange 15a.

Herein, as shown in FIGS. 2 and 4, partition members 51, 52 are provided inside the closed-cross section space 11A of the front header 11 (see FIGS. 5A and 5B) at positions which do not overlap with, in the vehicle width direction, the joint points of the front inclination roof reinforcements 18 and the front header 11.

Specifically, as shown in FIG. 4, the partition members 51, 52 comprise the single central partition member 51 and the two outward partition members 52, which are arranged inside the closed-cross section space 11A of the front header 11. The central partition member 51 is positioned at the central portion 11C, in the vehicle width direction, of the front header 11 (see FIGS. 3, 4 and 5B), and the outward partition members 52 are arranged at both outward portions, in the vehicle width direction, of the front header 11, i.e., at both base portions of the front header 11 (see FIGS. 3 and 4).

Specifically, the central partition member 51 is formed as shown in FIG. 6, and the outward partition member 52 is formed in FIG. 7. These members 51, 52 respectively comprise slant upper faces 51a, 52a which slant rearward and upward, pairs of right-and-left side wall portions 51b, 52b which extend downward from both sides, in the vehicle width direction, thereof, side flange portions 51c, 52c which respectively extend outward from respective lower ends and respective rear ends of the side wall portions 51b, 52b, rear flange portions 51d, 52d which protrude rearward and upward from rear ends of the slant upper faces 51a, 52a, and front flange portions 51e, 52e which protrude forward and downward from front ends of the slant upper faces 51a, 52a, which are formed integrally.

Further, the central partition member 51 is, as shown in FIG. 6, configured such that the width (length of the vehicle width direction) of the slant upper face 51a is substantially constant along the vehicle longitudinal direction. Meanwhile, the outward partition member 52 is, as shown in FIG. 7, configured such that the width of the slant upper face 52a becomes wider gradually toward a vehicle rear side and the rear flange portion 52d protruding from the rear end of the wide slant upper face 52a has a wider width than the rear flange portion 51d of the central partition member 51.

Thus, the central partition member 51 and the outward partition member 52 are formed substantially in the same shape, but they are formed differently so as to correspond to each space and shape of their arrangement locations, in the vehicle width direction, of the front header 11.

Thus, the upper vehicle-body structure of the vehicle V of the first embodiment specifically described above comprises the pair of right-and-left roof rails 3, 3 extending in the vehicle longitudinal direction at the right-and-left both end portions of the roof portion 10 of the vehicle body, the roof panel 13 provided between the pair of right-and-left roof rails 3, 3, the front header 11 provided at the front portion of the roof panel 13 in the vehicle width direction, the pair of right-and-left front pillars 1, 1 joined to the roof rails 3, 3 at the upper portions thereof and extending downward, the windshield 22 provided between the front header 11 and the front pillars 1, 1, the front inclination roof reinforcements 18 extending rearward, the front portions of which are joined to the front header 11 via the front end joint flanges 18af, and the central partition member 51 and the two outward partition members 52, as the partition member, which are provided inside the front header 11 at the positions which do not overlap with, in the vehicle width direction, the front inclination roof reinforcements 18 (see FIGS. 2-4).

According to this structure, the vertical vibrations of the front header 11 caused by the vertical vibrations of the windshield 22 can be suppressed with the light structure, so that the comfortability of the ride (the vibration damping performance) can be improved.

Specifically, since the windshield 22 is generally a weight object (structure) which is large enough to cover the windshield opening portion 22A, when the windshield 22 vibrates during the vehicle traveling, the front header 11 provided at the upper end of the windshield 22 also tends to vibrate easily. Accordingly, a driver, for example, feels vibrations (shaking) of relatively-low frequencies with driver's feet or through seat attachment portions, which may deteriorate the comfortability of the ride.

According to the upper vehicle-body structure of the vehicle V of the first embodiment, however, since the partition members 51, 52 are provided inside the front header 11 at the positions which do not overlap with, in the vehicle width direction, the front inclination roof reinforcements 18, the vertical vibrations of the front header 11 caused by the vertical vibrations of the windshield 22 can be suppressed in cooperation with the front inclination roof reinforcements 18 and the partition members 51, 52. Thus, the vertical vibrations of the front header 11 are so suppressed that the comfortability of the ride can be improved.

Further, since the central partition member 51 and the outward partition members 52 are provided inside the front header 11, the vibration damping performance can be improved without arranging any additional roof reinforcement in a space between the front header 11 and the front-side vehicle-width-direction roof reinforcement 15.

Therefore, such additional roof reinforcement does not interfere with any member, such as a wire-harness unit of a room lamp (not illustrated), which tends to be generally arranged in the space between the front header 11 and the front-side vehicle-width-direction roof reinforcement 15 at a central portion in the vehicle width direction, so that an onboard component such as the wire-harness unit of the room lamp, can be disposed surely, improving the comfortability of the ride of the vehicle V.

In the embodiment of the present invention, a pair of right-and-left front inclination roof reinforcements 18 are arranged side by side in the vehicle width direction, the front portion of one of the pair of front inclination roof reinforcements 18 is joined to the point between the central portion 11C of the front header 11 and one of the both outward end portions, in the vehicle width direction, of the front header 11, the front portion of the other of the pair of front inclination roof reinforcements 18 is joined to the point between the central portion 11C of the front header 11 and the other of the both outward end portions, in the vehicle width direction, of the front header 11, each of the pair of front inclination roof reinforcements 18 is configured to extend obliquely rearward and outward such that the rear end joint flange 18ar provided at its rear portion is positioned in the vicinity of the center pillar 31, and the partition members 51, 52 comprise the central partition member 51 positioned at the central portion 11C of the front header 11 and the pair of right-and-left outward partition members 52 positioned at the outward side, in the vehicle width direction, of the respective joint portions Tb of the pair of right-and-left front inclination roof reinforcements 18 to the front header 11 (see FIGS. 2-4).

Since the partition members 51, 52 are provided at the central portion 11C of the front header 11 and at the outward side, in the vehicle width direction, of the respective joint portions Tb of the front inclination roof reinforcements 18 to the front header 11 as described above, the vertical vibrations of the front header 11 caused by the vertical vibrations of the windshield 22 can be more suppressed in cooperation with the front inclination roof reinforcements 18 and the partition members 51, 52, compared with a case in which these partition members 51, 52 are provided at respective positions which overlap with the front inclination roof reinforcements 18. Accordingly, the above-described effects that the comfortability of the ride (the vibration damping performance) can be improved with the simple structure can be further enhanced.

Next, a second embodiment will be described. Herein, the same structures as the above-described first embodiment are denoted by the same reference characters, descriptions of which are omitted.

Embodiment 2

A vehicle Va of the second embodiment comprises, as shown in FIG. 8, a pair of right-and-left rear inclination roof reinforcements 61 which are, as shown in FIG. 8, configured such that their rear portions are joined to the rear header 12 and they extend obliquely forward and outward, in place of the rear-side first vehicle-width-direction roof reinforcement 16 and the rear-side second vehicle-width-direction roof reinforcement 17 which the vehicle V of the first embodiment comprises.

Specifically, the rear inclination roof reinforcements 61 are configured such that their rear portions are joined together to a central portion, in the vehicle width direction, of the rear header 12 via a rear-end flange portion 61ar, and configured in a roughly V shape in the plan view such that the lateral distance thereof becomes larger toward the vehicle front.

Moreover, as shown in FIG. 8, respective front portions of the rear inclination roof reinforcements 61 are joined to the roof rails 3 at a position between, in the vehicle longitudinal direction, the center pillar 31 and the rear header 12 (see the same figure).

Specifically, the both-side front portions of the rear inclination roof reinforcements 61 are joined to the both-side roof rails 3 via front-end flange portions 61af at respective positions near both-side corner portions CN which are formed by the front-side vehicle-width-direction roof reinforcements 15 and the both-side roof rails 3.

The vehicle Va of the second embodiment described above can suppress the vertical vibrations of the front header 11 caused by the vertical vibrations of the windshield 22, and can provide the same effect that the comfortability of the ride (the vibration damping performance) can be improved with the simple structure as the vehicle V of the first embodiment.

Further, according to the vehicle Va of the second embodiment, since the rear portions of the rear inclination roof reinforcements 61 extending obliquely forward and outward are joined to the rear header 12 (see the same figure), deformations of the rear baggage-room opening CrA and the lift-gate opening portion 41A are so suppressed that the vehicle-body torsional rigidity can be improved and the maneuverability/stability of the vehicle can be improved.

Moreover, since the front portions of the rear inclination roof reinforcements 61 are joined to the roof rails 3 at the position between the center pillar 31 and the rear header 12 as described above (see the same figure), deformation of the rear-side side door opening 35A (see FIG. 2) can be suppressed, so that the vehicle-body torsional rigidity can be more improved and the maneuverability/stability of the vehicle can be more improved.

Additionally, since the front portions of the rear inclination roof reinforcements 61 are joined to the both-side roof rails 3 at the positions near the corner portions CN formed by the front-side vehicle-width-direction roof reinforcements 15 and the roof rails 3 (see the same figure), deformation of a portion of the roof panel 13 which is enclosed by the both-side roof rails 3, 3, the front-side vehicle-width-direction roof reinforcement 15, and the rear header 12 can be suppressed (i.e., the surface rigidity of the roof panel 13 can be ensured), so that the vehicle-body torsional rigidity can be further improved and the maneuverability/stability of the vehicle can be further improved.

In correspondence of the present invention to the above-described embodiments, the longitudinal roof reinforcement of the present invention corresponds to the front inclination roof reinforcement 18 of the embodiments. Likewise, the partition member corresponds to the central partition member 51 and the outward partition member 52. However, the present invention is not to be limited to the above-described embodiments.

Specifically, while the central partition member 51 is provided at the central portion 11C of the front header 11 and the outward partition member 52 is provided at the outward side, in the vehicle width direction, of the respective joint portion Tb of the front inclination roof reinforcements 18 to the front header 11 in the above-described embodiments, the present invention is not limited to these embodiments but applicable to a structure in which either one of the central partition member 51 and the outward partition member 52 is provided inside the closed-cross section space A of the front header 11, for example. While it is preferable in effectively suppressing the vertical vibrations of the front header 11 with the light structure in cooperation with the front inclination roof reinforcement 18 and the partition member (the central partition member 51 and the outward partition member 52) that the partition member is provided inside the closed-cross section space A of the front header 11 at the position which does not overlap with, in the vehicle width direction, the front inclination roof reinforcement 18, another partition member may be additionally provided at any position, including the position which overlaps with the front inclination roof reinforcement 18.

What is claimed is:

1. An upper vehicle-body structure of a vehicle, comprising:
a pair of right-and-left roof rails extending in a vehicle longitudinal direction at right-and-left both end portions of a roof portion of a vehicle body;

a roof panel provided between the pair of right-and-left roof rails;

a front header provided at a front portion of the roof panel and extending in a vehicle width direction;

a pair of right-and-left front pillars joined to the roof rails at upper portions thereof and extending downward;

a windshield provided between the front header and the front pillars;

a pair of right-and-left longitudinal reinforcements arranged side by side in the vehicle width direction, a front portion of one of which is joined to a point between a central portion of the front header and one of both outward end portions, in the vehicle width direction, of the front header, a front portion of the other of which is joined to a point between the central portion of the front header and the other of the both outward end portions, in the vehicle width direction, of the front header, and each of which is configured to extend obliquely rearward and outward such that a rear portion thereof is positioned in the vicinity of a center pillar of the vehicle, and partition members provided inside the front header, each of the partition members comprising a central partition member positioned at the central portion of the front header and a pair of right-and-left outward partition members positioned at an outward side, in the vehicle width direction, of respective joint portions of the pair of right-and-left longitudinal reinforcements to the front header.

2. The upper vehicle-body structure of the vehicle of claim 1, wherein each of said partition members comprises a slant upper face which slants rearward and upward, a pair of right-and-left side wall portions which extend downward from both sides, in the vehicle width direction, thereof, and side flange portions which respectively extend outward, in the vehicle width direction, from respective lower ends and respective rear ends of said side wall portions.

3. The upper vehicle-body structure of the vehicle of claim 2, wherein each of said partition members further comprises a rear flange portion which protrudes rearward and upward from a rear end of said slant upper face and a front flange portion which protrudes forward and downward from a front end of the slant upper face, and said rear flange portion and said front flange portion are joined between said roof panel and said front header.

4. The upper vehicle-body structure of the vehicle of claim 1, wherein each of said central partition member and said outward partition member comprises a slant upper face which slants rearward and upward, a pair of right-and-left side wall portions which extend downward from both sides, in the vehicle width direction, thereof, and side flange portions which respectively extend outward, in the vehicle width direction, from respective lower ends and respective rear ends of said side wall portions, and a width, in the vehicle width direction, of the slant upper face of the central partition member is configured to be substantially constant along the vehicle longitudinal direction, whereas the width, in the vehicle width direction, of the slant upper face of the outward partition member is configured to become wider gradually toward a vehicle rear side.

5. An upper vehicle-body structure of a vehicle, comprising:

a pair of right-and-left roof rails extending in a vehicle longitudinal direction at right-and-left both end portions of a roof portion of a vehicle body;

a roof panel provided between the pair of right-and-left roof rails;

a front header provided at a front portion of the roof panel and extending in a vehicle width direction;

a pair of right-and-left front pillars joined to the roof rails at upper portions thereof and extending downward;

a windshield provided between the front header and the front pillars;

a longitudinal reinforcement extending rearward, a front portion of which is joined to the front header; and a partition member provided inside the front header at a position which does not overlap with, in the vehicle width direction, a joint point of the longitudinal reinforcement and the front header, wherein said partition member comprises a slant upper face which slants rearward and upward, a pair of right-and-left side wall portions which extend downward from both sides, in the vehicle width direction, thereof, and side flange portions which respectively extend outward, in the vehicle width direction, from respective lower ends and respective rear ends of said side wall portions.

6. The upper vehicle-body structure of the vehicle of claim 5, wherein said partition member further comprises a rear flange portion which protrudes rearward and upward from a rear end of said slant upper face and a front flange portion which protrudes forward and downward from a front end of the slant upper face, and said rear flange portion and said front flange portion are joined between said roof panel and said front header.

* * * * *